United States Patent
Kobetz et al.

[15] 3,696,161
[45] Oct. 3, 1972

[54] CHEMICAL PROCESS OF SEPARATING HYDROCARBYL ALUMINUM FROM OLEFINS BY THE USE OF 2:1 COMPLEXES OF ALUMINUM ALKYLS AND AN ALKALI METAL SALT

[72] Inventors: Paul Kobetz, Baton Rouge, La. 70808; Kenneth L. Lindsay, Baton Rouge, La. 70815

[73] Assignee: Ethyl Corporation, New York, N.Y.

[22] Filed: Sept. 30, 1970

[21] Appl. No.: 76,809

[52] U.S. Cl............260/677 A, 260/683.15, 260/448
[51] Int. Cl..............................................C07c 11/12
[58] Field of Search....260/677 A, 683.15, 448, 67 A

[56] References Cited

UNITED STATES PATENTS

| | | |
|---|---|---|
| 3,415,862 | 12/1968 | Ziegenhain................260/448 |
| 2,781,410 | 2/1957 | Ziegler et al..........260/683.15 |
| 2,787,626 | 4/1957 | Redman....................260/448 |
| 2,826,598 | 3/1958 | Ziegler et al...............260/448 |
| 3,384,651 | 5/1968 | Davis........................260/448 |

Primary Examiner—Delbert E. Gantz
Assistant Examiner—J. M. Nelson
Attorney—Donald L. Johnson, John F. Sieberth, Shelton B. McAnelly and Arthur G. Connolly

[57] ABSTRACT

Hydrocarbyl aluminum compounds are separated from olefins readily by the use of 2:1 complexes of aluminum alkyls and various complexing agents such as sodium fluoride and sodium cyanide. An important aspect is that the process does not require pyrolysis cleavage of the complexes. An overall olefins process is disclosed wherein the aluminum hydrocarbyl compounds removed from the olefins are recovered and recycled.

9 Claims, 3 Drawing Figures

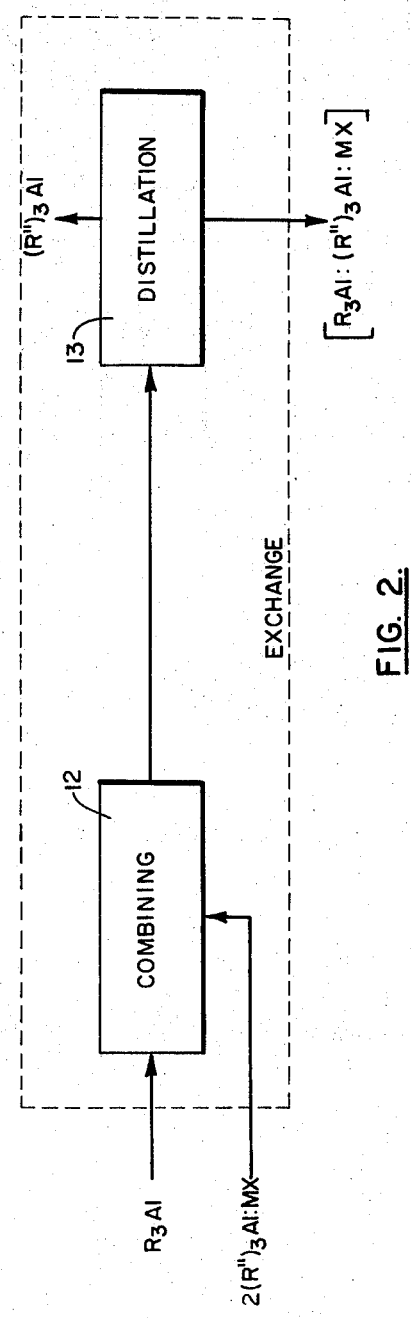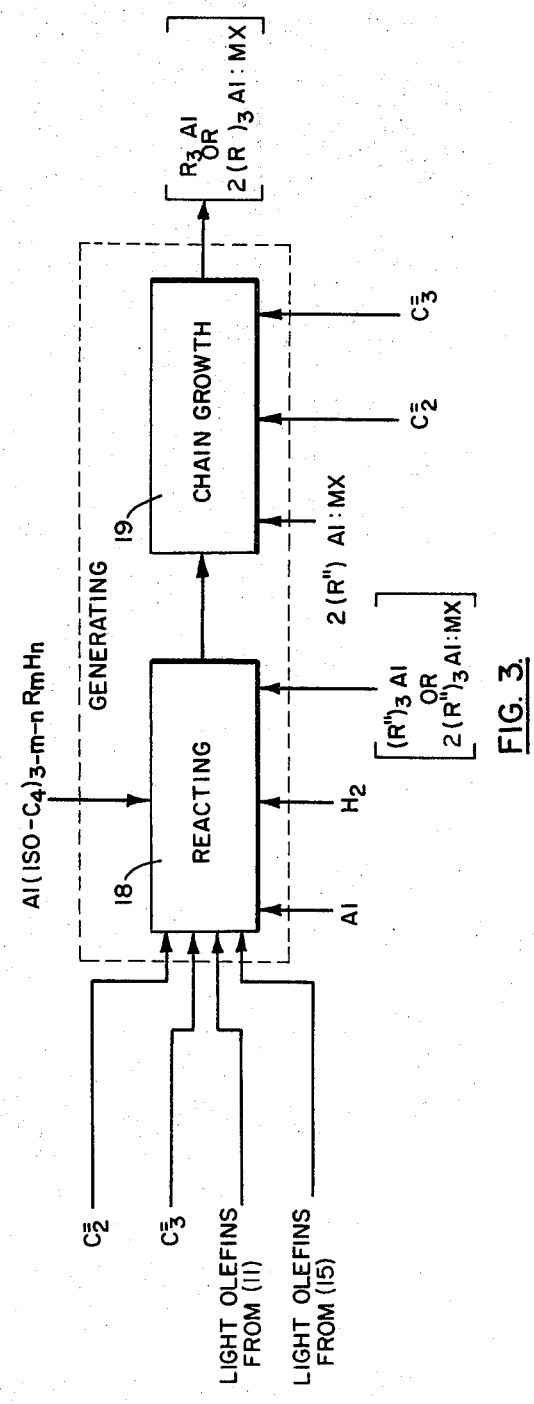

3,696,161

CHEMICAL PROCESS OF SEPARATING HYDROCARBYL ALUMINUM FROM OLEFINS BY THE USE OF 2:1 COMPLEXES OF ALUMINUM ALKYLS AND AN ALKALI METAL SALT

BACKGROUND OF THE INVENTION

1. Field of the Invention

The invention relates to aluminum chemistry production of olefins and in particular to processes wherein aluminum trialkyl compounds are recovered from admixture with olefins. A typical and preferred source of the mixture of aluminum alkyls and olefins involved in the processing is a chain growth operation wherein a lower olefin such as ethylene is added to a trialkyl aluminum compound to produce new trialkyl aluminum compound having higher molecular weight than the starting trialkyl aluminum compound and which is used to produce olefins.

2. Description of the Prior Art

The production of higher olefins from lower olefins and trialkyl aluminum compounds is described in numerous references. One such reference is Annalen der Chemie, Vol. 629, Nos. 1–3, pages 172–198. At the outset, this reference points to the problem of separation of olefins from aluminum trialkyls and goes into a discussion of the use of complexing agents such as $K[Al(C_2BR5)_3F]$ in a reaction with triethyl aluminum to form a complex containing two molecules of triethyl aluminum, viz., $KF \cdot 2Al(C^2H^5)$. As described in the reference, the olefins are separable from such a complex by distillation following which the 2:1 complex is pyrolyzed to regenerate the 1:1 complex $KF \cdot Al(C^2H^5)^3$ liberating aluminum triethyl. As far as is known, this prior art processing has never achieved commercial significance, perhaps due to the problems of side reactions under the severe conditions required for the pyrolysis of the 2:1 complex to produce the 1:1 complex. The present invention, on the other hand, avoids the pyrolysis of complexes and the severe conditions connected therewith and utilizes techniques relative to exchange reactions of aluminum alkyls with complexes and to simple decantation separation of olefins from such 2:1 complexes under certain conditions described.

SUMMARY OF THE INVENTION

The present invention relates to a process for separating monoolefin from trialkyl aluminum having a boiling point which is in proximity to that of the olefin. In this process the monoolefin and the trialkyl aluminum are combined with a binary intermolecular complex between triethyl aluminum or tripropyl aluminum and an alkali metal salt in molecular proportions of 2:1 respectively to form a mixture of (1) uncomplexed triethyl aluminum or tripropyl aluminum; (2) a tertiary intermolecular complex among (i) triethyl aluminum or tripropyl aluminum, (ii) said first named trialkyl aluminum, and (iii) said alkali metal salt, in molecular proportions of 1:1:1, respectively; and (3) said monoolefin. Mixture formed in the combining operation is subjected to distillation to remove triethyl aluminum or tripropyl aluminum leaving a mixture containing said ternary intermolecular complex and monoolefin. Mixture remaining from the distillation is treated with ethylene or propylene under displacement conditions to form a system composed of (1) a binary intermolecular complex as defined above; (2) olefins corresponding to the alkyl groups in said first named trialkyl aluminum; and (3) said monoolefin. Monoolefin is then recovered from said system.

Preferably, the monoolefin treated is free of those olefins that are readily separated from the trialkyl aluminum by other processes. Thus where the olefins contain light components that are readily removed by a distillation, such distillation is usually performed prior to the combining operation. Typically then, light olefins up to about dodecene, when present, are removed by distillation.

In a preferred aspect the present invention relates to an aluminum chemistry process for producing monoolefins having from about four to about 30 carbon atoms per molecule. The process involves generating a mixture of $R_3Al$ wherein R is alkyl having from about two to about 30 carbon atoms, and olefins having from about four to about 30 carbon atoms per molecule.

The mixture from the generating step is then subjected to a first distillation to remove substantially all light olefins having 12 and fewer carbon atoms per molecule, leaving a mixture containing: (1) olefins having from about 14 to about 30 carbon atoms per molecule, and (2) $R_3Al$.

The mixture of heavy olefins and $R_3Al$ from the subjecting to distillation (first) step is then combined with a complex of the form $2(R'')_3Al:MX$ wherein M is alkali metal, X is alkoxide, aryloxide, alkaryloxide, aralkoxide, fluoride, cyanide, cyanate, or azide and R'' is ethyl or propyl, thereby forming a mixture containing: (1) $(R'')_3Al$, (2) $(R'')_3Al:R_3Al:MX$, and (3) the olefins (1) from the first distillation.

The mixture from the combining step is then subjected to a second distillation to remove $(R'')_3Al$, leaving a mixture containing: (1) olefins having from about 14 to about 30 carbon atoms per molecule, and (2) a complex of the type $(R'')_3Al:R_3Al:MX$.

The mixture from the second distillation is then subjected to displacement with ethylene or propylene to form: (1) $2(R'')_3Al:MX$, (2) olefins corresponding to the alkyl groups R in the complex of the second distillation and (3) olefins (1) of the second distillation.

The displacement mixture is then subjected to a third distillation to remove light olefins having up to about 14 carbon atoms per molecule, leaving a mixture containing: (1) olefins having from about 16 carbon atoms per molecule to about 30 carbon atoms per molecule, and (2) a complex of the form $2(R'')_3Al:MX$.

The mixture of the third distillation is then subjected to a phase separation to recover (1) an olefin phase having less than about 5 wt. percent $2(R'')_3Al:MX$, and (2) a separate phase consisting essentially of $2(R'')_3$ $Al:MX$.

In a preferred aspect at least a part of the $2(R'')_3$ $Al:MX$ phase recovered at the phase separation is fed to the combining step.

In a preferred aspect the generating step includes a chain growth reaction of ethylene or propylene with at least a part of the $(R'')_3Al$ removed in the second distillation.

In a preferred aspect the generating step includes: reacting at least a part of the light olefins removed at either or both of the first and second distillations with aluminum and hydrogen and (R'')₃Al or (R''')₃Al to produce (R''')₃Al wherein R''' is individual or mixture of two or more radicals having from about 2 to about 10 carbon atoms each, and subjecting said (R''')₃Al and (R'')₃Al to chain growth with ethylene or propylene to produce R₃Al.

In another preferred aspect, the generating step includes: forming (R''')₃Al wherein R''' is as defined in the foregoing by reacting at least a part of the light olefins from either or both of the first and second distillations with an isobutyl radical-containing alkyl aluminum compound represented by the general formula $Al(iso-C_4H_9)_{3-m-n}R^{iv}{}_mH_n$ wherein $R^{iv}$ is a radical of the formula $-CH_2-CHR^vR^{vi}$ wherein $R^v$ and $R^{vi}$ are alkyl having from one to about 20 carbon atoms each; $m$ is 2, 1 or 0; and $n$ is 1 or 0, the sum of $m$ and $n$ being not more than 2, and subjecting at least a part of the (R''')₃Al to chain growth with ethylene or propylene to produce R₃Al.

In a preferred aspect the isobutyl radical containing alkyl aluminum compound is triisobutyl aluminum.

In another preferred aspect the isobutyl radical containing alkyl aluminum compound is diisobutyl aluminum hydride.

In a particularly preferred aspect, (R'')₃Al consists essentially of triethyl aluminum, the complex 2(R'')₃Al:MX of the combining step is 2(C₂H₅)₃Al:sodium cyanide, the complex of the product mixture of the second distillation is R₃Al:(C₂H₅)₃Al:sodium cyanide, ethylene is used in the displacement and the complex formed in the displacement is 2(C₂H₅)₃Al: sodium cyanide.

BRIEF DESCRIPTION OF THE DRAWING

FIG. 2 shows a block diagram of the portion of the overall process of FIG. 1 directed to the aluminum alkyl exchange portion of the process of FIG. 1.

FIG. 3 shows a block diagram of a portion of the process of FIG. 1 directed to details of various alternate arrangements for producing aluminum alkyls and olefins used in the process.

Figure 1:
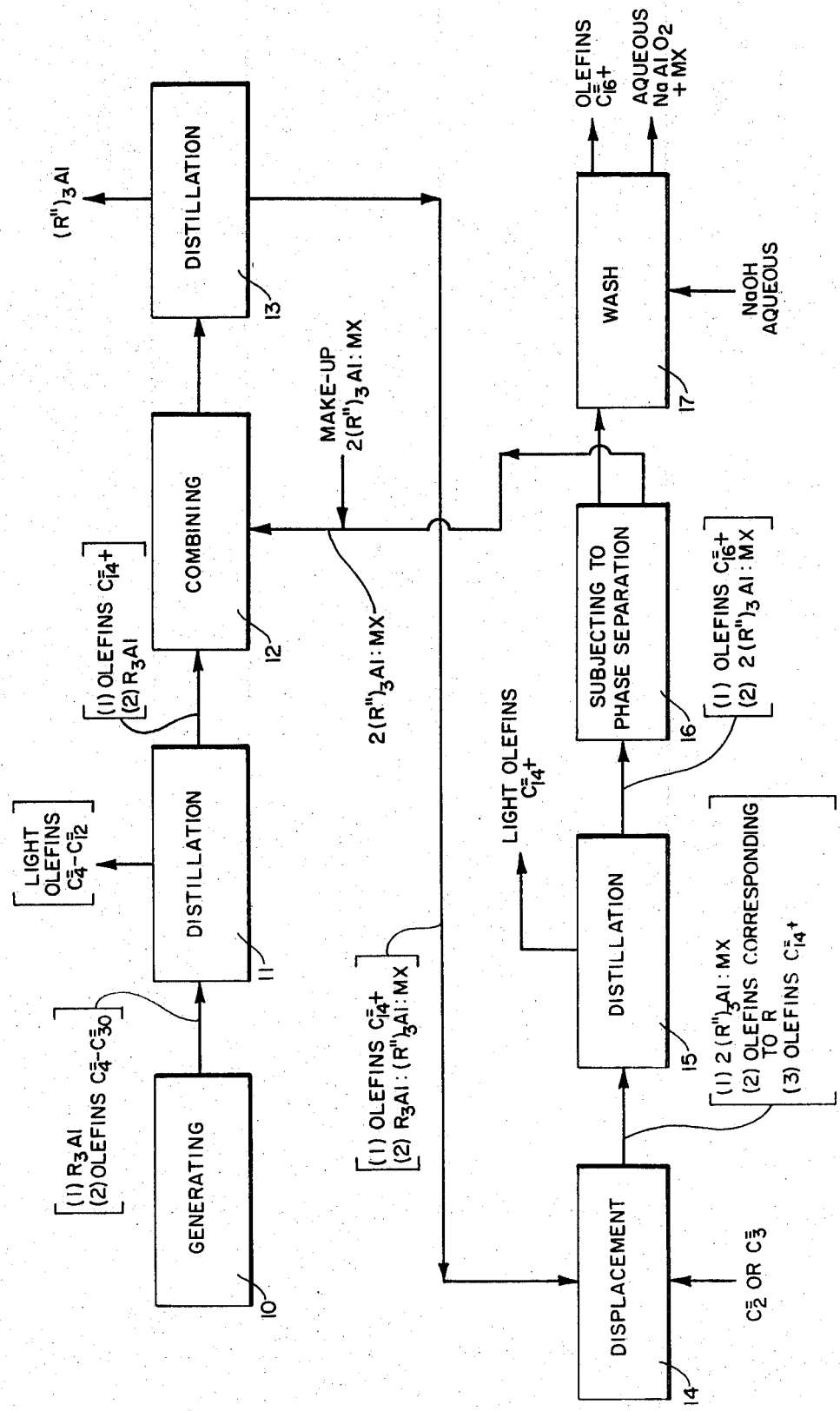
FIG. 1 shows a block diagram of an olefin process involving the teachings of the present invention.

With reference now to FIG. 1 of the drawing, the apparatus shown therein illustrates a preferred embodiment of the features of the present invention in an aluminum chemistry olefins process. The generating step 10 which will be described in greater detail in several embodiments in connection with FIG. 3 produces an effluent stream containing trialkyl aluminum wherein the alkyl groups or radicals have from about two or four to about 30 carbon atoms per group or radical and olefins having from about four to about 30 carbon atoms per molecule. The trialkyl aluminum compounds produced by the generating step are preferably mixtures containing two or more alkyl groups other than ethyl or propyl but which may include some ethyl as well as substantially pure higher alkyl trialkyl aluminum compounds wherein all the alkyl groups are substantially the same, that is, butyl, and/or one or more of each of the others of the homologous series; viz, hexyl, heptyl, octyl, nonyl, decyl, undecyl, dodecyl, tridecyl, tetradecyl, and so forth up to about eicosyl since in usual aluminum chemistry mixtures the percentage of alkyl groups higher than eicosyl is quite small. Preferably the present process is operated without any significant content of triethyl aluminum in the effluent from generating step 10 because of the similarity of boiling points of triethyl aluminum and dodecene.

The product from the generating step 10 is delivered to distillation 11 for removal of the light olefins having from 2–12 carbon atoms per molecule. Distillation 11 is preferably a multistage flash distillation of low cost operation and construction since the system does not require a sharp fractionation. Typically the final stage of the distillation 11 is performed at a temperature from about 200° to about 500° F. and at a pressure from about 2 to about 40 millimeters of mercury absolute to produce an overhead stream of light olefins ranging from about butene through dodecene. In most instances it is particularly desired that substantially all dodecene be removed at that point otherwise the dodecene will complicate subsequent separations of triethyl aluminum. As a practical matter, a series of five flash distillations at 11 with conditions set to remove dodecene, removes some olefins higher than dodecene, including tridecene, tetradecene, pentadecene and even some hexadecene, but generally in progressively smaller quantities. Generally speaking, more preferred conditions for the final stage of distillation 11 include a temperature from about 250° to about 380°, typically 310° F.; and a pressure from about 3 to about 15; typically 7 millimeters of mercury absolute.

Following the distillation removal of the light olefins in 11, a residual stream of one or more olefins of about tetradecene and higher plus the trialkyl aluminum compounds from the generating step 10 are delivered to combining step 12 wherein the stream is mixed with a complex of the form 2(R'')₃Al:MX or the constituents of the complex such as separate (R'')₃Al and MX. In this formula M is alkali metal, preferably sodium or potassium, or a mixture of alkali metals such as sodium and potassium, typically in about 1:1 molar ratio; X is alkoxide, aryloxide, alkaryloxide, aralkoxide, halogen or pseudo halogen. Preferred X is fluoride, phenoxy, methoxy, cyanide, cyanate, and azide, particularly those of sodium, and to a lesser extent, potassium; R'' is ethyl or propyl.

Preferred complexes because of their solubility characteristics are: 2-triethylaluminum:sodium fluoride, 2-triethylaluminum:potassium fluoride, 2-triethylaluminum: potassium phenoxide, 2-tripropylaluminum:sodium cyanide, 2-tripropylaluminum:sodium phenoxide, 2-tripropylaluminum:sodium fluoride, 2-triethylaluminum:potassium cyanide, 2-tripropylaluminum:potassium cyanide, 2-triethylaluminum:sodium cyanide.

Other preferred complexes are:
2-triethylaluminum, ½ sodium cyanide, ½ potassium cyanide
2-tripropylaluminum, ¼ sodium cyanide, ¾ potassium cyanide
2-triethylaluminum, ½ sodium fluoride, ½ potassium fluoride
2-tripropylaluminim, ¼ sodium fluoride, ¾ potassium fluoride
2-triethylaluminum, sodium cyanate
2-tripropylaluminum, sodium cyanate
2-triethylaluminum, potassium cyanate
2-tripropylaluminum, potassium cyanate 2-triethylaluminum, sodium phenoxide
2-tripropylaluminum, potassium phenoxide
2-triethylaluminum, sodium methoxide
2-tripropylaluminum, sodium methoxide
2-triethylaluminum, potassium ethoxide
2-tripropylaluminum, potassium ethoxide
2-triethylaluminum, sodium benzyloxide
2-tripropylaluminum, potassium benzyloxide
2-triethylaluminum, sodium methyl phenoxide
2-tripropylaluminum, potassium methyl phenoxide
2-triethylaluminum, sodium azide
2-triethylaluminum, potassium azide 2-tripropylaluminum, sodium azide
2-tripropylaluminum, potassium azide
2-tripropylaluminum, ½ sodium azide, ½ potassium azide
2-triethylaluminum, ½ sodium azide, ½ potassium azide
2-triethylaluminum, ½ sodium cyanate, ½ potassium cyanate
2-tripropylaluminum, ½ sodium cyanate, ½ potassium cyanate
2-triethylaluminum, ½ sodium phenoxide, ½ potassium phenoxide
2-tripropylaluminum, ½ sodium phenoxide, ½ potassium phenoxide
2-triethylaluminum, potassium methoxide
2-tripropylaluminum, potassium methoxide
2-triethylaluminum, sodium n,n-dimethylamide Although most of these complexes such as the sodium fluoride and sodium cyanide complexes are readily prepared separately or in an in situ addition of the constituents to the reaction system itself, certain complexes are preferably prepared by reaction sequences other than the combination of MX and 2(R″)₃Al. The preparation of NaN(Me)₂2Et₃Al, for example, is indicated by the reactions:

(1) $Et_3Al + HNMe_2 \rightarrow Et_2AlNMe_2 + C_2H_6$
(2) $Na + 1⅓ Et_3Al \rightarrow NaAlEt_4 + ⅓ Al$
(3) $NaAlEt_4 + Et_2AlNMe_2 \rightarrow NaNMe_2·2Et_3Al$ The hydrocarbyloxy type of complexes can be prepared in several ways such as by the combination of the desired alkali-or alkaline-earth metal hydrocarbyloxy compound with the aluminum alkyl. An alternate method of producing such hydrocarbyloxy complexes is the addition of dialkyl aluminum hydrocarbyloxy compound to alkali metal aluminum tetraalkyl.

The principal desired characteristics of these complexes, particularly the preferred ones are: low solubility of about 5 percent by weight or less in olefins having 14 and more carbon atoms per molecule, avoidance of side reaction tendencies, stability under the conditions of the process and freedom from excessive ease of conversion of the 2:1 molar complexes into 1:1 molar complexes.

The operation 12 is an exchange type of operation wherein up to about half of the R″ alkyl groups in the complex are exchanged with R alkyl groups of the stream from distillation 11 to produce new alkyl aluminum compounds and new complexes. Typically, where the alkyl groups of the 2:1 complex fed to the combining step are ethyl and wherein the number of mols of trialkyl aluminum (R″)₃Al in the complex fed is about twice the number of mols of the trialkyl aluminum R₃Al fed to step 12 from step 11, substantially all free trialkyl aluminum compounds resulting are triethyl aluminum compounds (Et₃Al and the new complex is also a 2:1 complex f 2 aluminum alkyl:MX wherein half of the aluminum alkyl of the complex is the R₃Al from distillation 11 and the other half is (R″)₃Al. In a sense then the combining step 12 is a displacement of alkyl aluminum compounds or of alkyl radicals from the complexes, the displacement following a selective route wherein heavy alkyl groups effectively displace light alkyl groups such as ethyl as an incident to the formation of the free triethyl aluminum compounds.

The mixing of the 2:1 complexes and the trialkyl aluminum is considered to lead to the formation of an equilibrium mixture, typically:

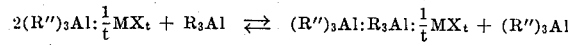

The distilling displaces the equilibrium by removing the most volatile component (R″)₃Al overhead, thus driving the equilibrium reaction to completion.

The displacement 12 is performed at a temperature from about 0° to about 190° C., at a pressure from about 5 to about 100 pounds per square inch absolute, and for a time from about 0.1 seconds to about 1 hour. Preferred conditions include a temperature from about 75° to about 150° C., a pressure from about 10 psia to about 20 psia and a time duration from about one-half second to about 15 minutes. Typical conditions for the reacting step are about 125° C., about atmospheric pressure, a reaction time of about 5 minutes.

The (R″)₃Al compounds such as triethyl aluminum produced in the combining or displacement step 12 are removed by a concurrent or subsequent distillation 13 leaving a remainder of (1) olefins having 14 and more carbon atoms per molecule plus (2) new complexes R₃Al:MX. Distillation 13 preferably is another simple, low-cost, flash operation because sharp fractionation separation is not necessary and because of the prior removal of dodecene at distillation 11.

Temperatures range from about 80° C. to about 175° C. and pressures range from about 1.0 to about 70 millimeters of mercury absolute. In general, desired operation always remains below the pyrolysis temperature for the conversion of the 2:1 molar complexes into a 1:1 molar complexes or for the liberation of olefins. Generally speaking, the higher temperature and/or lower pressures of the ranges recited are required where the "more volatile" category of hydrocarbyl aluminum includes compounds of higher molecular weight than triethyl aluminum, such as tri-n-butyl aluminum.

A narrower preferred range for the vapor temperature of the distilling step of the present process is from about 90° C. to about 125° C. A narrower preferred range for the pressure of the distilling step of the present process is from about 2 to about 20 millimeters of mercury absolute. A typical preferred set of conditions for the distilling step include a vapor temperature of about 110° C. and a pressure of about 5 millimeters of mercury absolute for triethyl aluminum. Similar typical conditions for a more volatile category including tripropyl aluminum is 120° C. at 5 mm. Similar typical conditions for a more volatile category including tri-n-butyl aluminum is 140° C. at 2 mm.

The heavy olefins and the complex from distillation 13 are delivered to displacement 14 to which is also fed one or more lower olefins such as ethylene or propylene, preferably olefin corresponding in terms of carbon atoms per molecule to the number of carbon atoms in the alkyl groups of the complex $2(R'')_3Al:MX$ fed to the combining step 12. In other words, where $R''$ in $2(R'')_3Al:MX$ is ethyl or propyl, or a mixture of ethyl and propyl; ethylene or propyl, or a mixture of ethylene and propylene, respectively, is preferably fed to step 14. In this displacement the remaining R alkyl groups in the complex are replaced by alkyl groups corresponding to the displacing ethylene or propylene, in effect regenerating the complex $2(R'')_3Al:MX$ for recycle or other use and releasing olefins which correspond in number of carbon atoms per molecule to the number of carbon atoms in the R alkyl groups of the complexes fed to 14. Additionally, the heavy olefins from distillation 13 are carried through the displacement 14 substantially unchanged.

Thus, the effluent from the displacement 14 contains (1) the regenerated complexes, (2) the new olefins produced in the displacement, and (3) heavy olefins.

The displacement 14 is preferably performed at a temperature from about 450° to about 650° F., a pressure from about 50 to about 500 pounds per square inch absolute and for a time from about 0.1 to about 10 seconds.

The effluent from 14 is delivered to distillation 15, which again is preferably an inexpensive multistage flash operation which removes light olefins up to and including dodecene and preferably a major portion of the tetradecene as well, leaving a residual stream of (1) olefins of mainly 16 and more carbon atoms per molecule plus (2) the regenerated complex $2(R'')_3Al:MX$.

Typically the final stage of this flash distillation 15 is performed at a temperature from about 200° to about 500°, preferably about 280° to about 400°, typically about 325° F.; and at a pressure from about 2 to about 40, preferably 3 to about 12, typically 5 millimeters of mercury absolute, to produce an overhead stream of olefins ranging from about butene through tetradecene.

Upon standing for a brief period, such as 5–30 minutes at a temperature of about 25° to about 100° C., typically 30°, 45° and 60° C., the mixture of heavy olefins and the complex in the effluent from distillation 15 readily forms two separate liquid phases of low mutual solubility, preferably as low as 5 percent or less of the preferred complexes $2(R'')_3Al:MX$ being soluble in the heavy olefins.

The two liquid phases are separated at 16 which provides a first stream of heavy olefins of hexadecene and higher containing up to about 5 percent by weight of the complex and a second stream consisting essentially of the complex and which contains some residual olefins. The latter stream typically is recycled to the combining step 12. The system is thus recirculatory with respect to the complex, replenishment of complex lost in the heavy olefins and elsewhere preferably being accomplished by supplying make-up complex or its constituents to the system at any convenient point. A typical feed point is to the line returning recycle complex to the combining step 12 as indicated. The phase separation 16 is primarily a density-based operation as performed by a simple decantation, or by centrifuge or other such means which effectively enhance, assist or magnify gravity separations.

Preferably, the make-up complex is $2(R'')_3Al:MX$ which corresponds to the recovered complex; however, such correspondence is not essential as other alkyl groups may be present. In preferred systems with preferred complexes, the amount of make-up catalyst is low, typically about 5 percent of the complex recovered at phase separation 16, or less.

The residual complex contained in the olefins leaving the phase separation or decantation 16 is readily removed by a "washing" operation at 17 which typically uses caustic such as dilute aqueous sodium hydroxide to convert the residual complex contained therein to a sodium aluminate aqueous phase which is readily removed from the olefins by a decantation or gravity based separation within the wash operation 17. The wash temperature is from about 100° to about 250°, typically 175° F., using caustic at a concentration of about 0.02 to about 5.0, typically about 0.4 weight percent in proportions of 0.2 to 5.0 volumes of caustic solution per volume of olefins.

With reference now to FIG. 2 of the drawing, the apparatus shown therein indicates certain details with respect to the combining step 12 and the distilling step 13 of FIG. 1. The two steps 12 and 13 are shown included within a single overall block labeled "exchange." The overall showing indicates that the two steps 12 and 13 may be performed in separate environments in sequence under similar or different conditions and that if desired they may also be performed substantially coincidentally within a single environment as, for example, when the more volatile constituents of a mixture, typically triethyl aluminum, are removed from the environment during the course of the combining operation.

To this end, trialkyl aluminum compound $R_3Al$ and complex $2(R'')_3Al:MX$ are fed to the combining step 12, wherein they are combined to accomplish the desired exchange reaction. The combining operation is suitably performed with or without diluent such a olefins being present. Typically, the olefins are process engendered and associated such as, for example, the heavy olefins supplied to the combining step 12 of FIG. 1 in admixture with $R_3Al$.

Upon removal of the light trialkyl aluminum compound $R''_3Al$, the distillation step 13 produces a heavier boiling mixture of 2:1 complex having two molecules of trialkyl aluminum compound and one molecule of complexing agent MX as defined in the foregoing.

With reference now to FIG. 3 of the drawing, various apparatus arrangements for the generating step 10 of FIG. 1 are indicated. A preferred embodiment of the generating step 10 of FIG. 1 includes the combination of a chain growth or polymerization or, generally speaking, a synthesis operation of alkyl aluminum with lower olefins to produce higher alkyl aluminum compounds than the starting alkyl aluminum. The starting alkyl aluminum compound fed to the synthesis operation may be a recycle stream such as $R''_3Al$ distilled from 13 and the lower olefin fed to the synthesis operation may be either ethylene or propylene or a mixture of the two, to produce the well known statistical distributed product mixture in which the distribution of the components are set forth by the Poisson relationship. Thus in this embodiment, all or part of the $R''_3Al$ from distillation 13 is fed to chain growth 19 of FIG. 3 directly or indirectly through reacting step 18 which also receives either or both of ethylene or propylene or other olefins as indicated in FIG. 3. An alternative from of the chain growth 19 employs as feed a trialkyl aluminum complex such as that produced by the phase separation 16; viz., $2(R'')_3Al:MX$. These complexes will grow with lower olefins such as ethylene and propylene to provide higher alkyl trialkyl aluminum complexes of the form $2R_3Al:MX$ which constitutes a suitable feed to the combining step 12 of FIG. 1 for exchange reaction with the complex $2(R'')_3Al:MX$ to produce mixed complexes of the form $R_3Al:(R'')_3Al:MX$ such as that feed displacement 14 in FIG. 1.

The trialkyl aluminum compound fed to chain growth 19 is alternately obtained from a preliminary reacting step 18 involving various characteristic aluminum chemistry reactions such as hydroalumination and/or displacement. In one exemplary arrangement of hydroalumination, $R''_3Al$ such as that obtained from distillation 13 of FIG. 1, aluminum, hydrogen and appropriate olefin are reacted to produce additional $R''_3Al$ for feed to chain growth or an intermediate molecular weight trialkyl aluminum compound $(R''')_3Al$ for feed to chain growth. In displacement-type operations, various light olefins are reacted with a readily displaceable trialkyl aluminum compound at 18 to produce an intermediate trialkyl aluminum compound for feed to chain growth 19. Thus in a preferred embodiment the generating step 10 includes a reaction of forming an intermediate trialkyl aluminum compound $(R''')_3Al$ by reacting a part of the light olefin from distillation 11 or distillation 15 with $(R'')_3Al$, aluminum and hydrogen to produce additional $(R''')_3Al$ which may include $(R'')_3Al$ and which has alkyl radicals of from about two to about 10 carbon atoms each.

An alternate embodiment of the generating step 10 of FIG. 1 is illustrated in FIG. 3 wherein the aforementioned $(R''')_3Al$ is obtained by reacting at least a part of the light olefins from either or both of distillations 11 and 15 with an isobutyl radical-containing alkyl aluminum represented by the general formula $Al(iso-C_4H_9)_{3-n-m}R^{iv}$ where $R^{iv}$ is a radical of the formula —$CH_2$—$CHR^vR^{vi}$ wherein $R^v$ and $R^{vi}$ are alkyl having form one to about 20 carbon atoms each; $m$ is 2, 1 or 0; and $n$ is 1 or 0, the sum of $m$ and $n$ being not more than 2. The $(R''')_3Al$ thus formed by the displacement reaction at 18 is fed to chain growth 19 for reaction with ethylene or propylene as indicated and previously discussed.

The following example indicates preferred embodiments and aspects of the present invention and is presented in an exemplary, but not limiting sense.

EXAMPLE

Ethylene and triethyl aluminum are allowed to react in a continuous, tubular steel vessel at a temperature of 280° F. and a pressure of 2,500 psig to produce a mixture of predominantly straight chain aluminum alkyls and predominantly straight chain alpha olefins whose distribution is shown in the Table (generating step 10 in FIG. 1).

TABLE

Chain-Growth Product Distribution

| Aluminum Alkyls, alR* where $R = C_nH_{2n+1}$, moles/hour | | Alpha Olefins, $C_2H_{2n}$, moles/hour | |
|---|---|---|---|
| $n = 2$ | 10.9 | $n = 2$ | 1068.2 |
| 4 | 25.1 | 4 | 50.4 |
| 6 | 44.7 | 6 | 47.2 |
| 8 | 63.6 | 8 | 61.4 |
| 10 | 70.2 | 10 | 65.0 |
| 12 | 62.7 | 12 | 58.5 |
| 14 | 46.8 | 14 | 49.4 |
| 16 | 30.3 | 16 | 43.8 |
| 18 | 17.3 | 18 | 40.1 |
| 20 | 9.2 | 20 | 32.4 |
| 22 | 4.7 | 22 | 21.6 |
| 24 | 2.4 | 24 | 12.4 |
| 26 | 1.3 | 26 | 6.7 |
| 28 | 0.8 | 28 | 3.4 |
| 30 + | 0.9 | 30+ | 3.1 |

*alR refers to a single aluminum-carbon bond in $AlR_3$.

Upon emerging from the chain growth reactor, the product mixture whose composition is described in Table I is subjected to a series of flash distillations at progressively decreasing pressures in order to recover unreacted ethylene for recycle to the chain reactor and to remove lighter olefins in the $C_4$ to $C_{12}$ range. The final stage in this series of flash distillations is carried out at a temperature of 310° F. and a pressure of 7 millimeters of mercury absolute (distillation step 11 in FIG. 1), under which conditions approximately 95 percent of the $C_{12}$ olefin and substantially all lighter olefins are removed overhead.

The non-volatile fraction from the preceding distillation, consisting essentially of aluminum alkyls plus olefins having a chain length of $C_{14}$ and higher is combined with 130 mols per hour of an aluminum alkyl complex, $2(C_2H_5)_3Al:NaCN$ (combining step 12 in FIG. 1) at a temperature of 125° C. and atmospheric pressure for 5 minutes average contact time and then distilled (distillation step 13 in FIG. 1) at a temperature of 320° F. and a pressure of 5 millimeters of mercury absolute, taking overhead 130 mols per hour of triethyl aluminum which is recycled back to generating step 10.

The non-volatile fraction from the above distillation consisting essentially of $C_{14}$ and higher olefins plus a mixed complex of the structure $(C_2H_5)_3Al:R_3Al:NaCN$ in reacted with a large excess of ethylene at 550° F. and 200 psia for 2 seconds (displacement reaction 14 in FIG. 1), in order to convert the alkyl groups in $R_3Al$ to olefins and regenerate the $2(C_2H_5)_3Al:NaCN$ complex. The product from displacement reaction 14, consisting mainly of (1) unreacted ethylene, (2) olefins fed to displacement reaction 14, (3) olefins generated in displacement reaction 14 and (4) the $2(C_2H_5)_3Al:NaCN$ complex is subjected to a series of flash distillations at progressively decreasing pressures in order to recover unreacted ethylene for recycle to the displacement reactor and remove lower molecular weight olefins in the $C_4$ through $C_{14}$ range. The final stage in this series of flash distillations (distillation step 15 in FIG. 1) is carried out at a temperature of 325° F. and a pressure of 5 millimeters of mercury absolute. Under these conditions approximately 95 percent of the $C_{12}$ olefins and 80 percent of the $C_{14}$ olefins are removed overhead with the lighter olefins.

The non-volatile fraction from the preceding distillation, mainly $C_{16}$ and heavier olefins plus the $2(C_2H_5)_3Al:NaCN$ complex is cooled to 30° C. and allowed to stand for 10 minutes in order to allow separation into two liquid phases, a lower phase which is mainly the $2(C_2H_5)_3AL:NaCN$ complex plus a small amount of dissolved olefin and a separate phase which is mainly $C_{16}$ and heavier olefins containing less than about 5 wt. percent of dissolved $2(C_2H_5)_3Al:NaCN$ complex (phase separation step 16 in FIG. 1). The lower phase from separation 16 is recycled to combining step 12 and the upper phase is washed with an excess of 0.4 wt. percent aqueous NaOH at a temperature of 175°F. in order to remove the dissolved aluminum alkyl complex (wash step 17 in FIG. 1). The washed olefin, now essentially free of aluminum, is combined with the volatile olefin fractions from the two distillations (distillation 11 and distillation 15 in FIG. 1) and passed to a series of fractional distillation columns in order to recover purified alpha olefins of single carbon numbers or cuts of several olefins for subsequent use, sale or blending as desired.

From the foregoing, it is obvious that numerous variations are possible within the scope of the invention as disclosed in the present specification and claims. It is obvious to those skilled in the art that specific descriptions are exemplary and that the invention is not to be limited except as defined in the claims.

I claim:

1. A process of separating monoolefin from trialkyl aluminum having a boiling point in proximity thereto which comprises:
    a. combining the monoolefin and the trialkyl aluminum with a binary intermolecular complex between triethyl aluminum or tripropyl aluminum and an alkali metal salt in molecular proportions of 2:1 respectively to form a mixture of
        1. uncomplexed triethyl aluminum or tripropyl aluminum;
        2. a ternary intermolecular complex among (i) triethyl aluminum or tripropyl aluminum, (ii) said first named trialkyl aluminum, and (iii) said alkali metal salt, in molecular proportions of 1:1:1, respectively; and
        3. said monoolefin;
    b. subjecting mixture formed at (a) to distillation to remove triethyl aluminum or tripropyl aluminum and leaving a mixture containing said ternary intermolecular complex and monoolefin;
    c. treating mixture remaining at (b) with ethylene or propylene under displacement conditions at a temperature from about 450° to about 650° F., and a pressure of from about 50 to about 500 pounds per square inch absolute to form a system composed of
        1. a binary intermolecular complex as defined above;
        2. olefins corresponding to the alkyl groups in said first-named trialkyl aluminum; and
        3. said monoolefin; and
    d. recovering said monoolefin from said system.

2. A process for producing monoolefins having from about four to about 30 carbon atoms per molecule which comprises:
    a. generating a mixture of $R_3Al$ wherein R is alkyl having from about two to about 30 carbon atoms, and olefins having from about four to about 30 carbon atoms per molecule,
    b. subjecting to distillation the mixture from (a) to remove substantially all light olefins having 12 and fewer carbon atoms per molecule, leaving a mixture containing:
        1. olefins having from about 14 to about 30 carbon atoms per molecule, and
        2. $R_3Al$,
    c. combining the mixture of olefins (1) and $R_3Al$ (2) from (b) with a complex of the form $2(R'')_3Al:MX$ wherein M is alkali metal, X is alkoxide, aryloxide, alkaryloxide, aralkoxide, fluoride, cyanide, cyanate, or azide and $R''$ is ethyl or propyl, thereby forming a mixture containing:
        1. $(R'')_3Al$,
        2. $(R'')_3Al:R_3Al:MX$, and
        3. the olefins (1) from step (b),
    d. subjecting to distillation the mixture formed at (c) to remove $(R'')_3Al$, leaving a mixture containing:
        1. olefins having from about 14 to about 30 carbon atoms per molecule, and
        2. a complex of the type $(R'')_3Al:R_3Al:MX$,
    e. subjecting the mixture of olefins (1) and complex (2) from (d) to displacement with ethylene or propylene at a temperature of from about 450° to about 650° F. and at a pressure of from about 50 to about 500 pounds per square inch absolute to form:
        1. $2(R'')_3Al:MX$,
        2. olefins corresponding to the alkyl groups R in the complex from (d) and
        3. olefins (1) of (d),
    f. subjecting to distillation the mixture from (e) to remove light olefins having up to about 14 carbon atoms per molecule, leaving a mixture containing:
        1. olefins having from about 16 carbon atoms per molecule to about 30 carbon atoms per molecule, and
        (2) $2(R'')_3Al:MX$, and
    g. subjecting the mixture of (1) and (2) from (f) to phase separation to recover
        1. olefin phase having less than about 5 wt. percent $2(R'')_3AL:MX$
        2. a separate phase consisting essentially of $2(R'')_3Al:MX$.

3. The process of claim 2 further characterized in that at least a part of the $2(R'')_3Al:MX$ phase recovered at (g) is fed to (c).

4. The process of claim 2 further characterized in that the generating step (a) includes a chain growth reaction of ethylene or propylene with at least a part of the $(R'')_3Al$ removed in step (d).

5. The process of claim 2 further characterized in that the generating step (a) includes:
    a-1. reacting at least a part of the light olefins removed at either or both of steps (b) and (f) with aluminum and hydrogen and $(R'')_3Al$ or $(R''')_3Al$ to produce $(R''')_3Al$ wherein $R'''$ is individual or mixture of two or more alkyl radicals having from about two to about 10 carbon atoms each, and
    a-2. subjecting said $(R''')_3Al$ to chain growth with ethylene or propylene to produce $R_3Al$.

6. The process of claim 2 further characterized in that the generating step (a) includes:

a-1. forming $(R''')_3Al$ wherein $R'''$ is individual or mixture of two or more alkyl radicals having from about two to about 10 carbon atoms each by reacting at least a part of the light olefins from either or both of steps (b) and (f) with an isobutyl radical-containing alkyl aluminum compound represented by the general formula $Al(iso-C_4H_9)_{3-m-n}R^{iv}{}_mH_n$ wherein $R^{iv}$ is a radical of the formula $-CH_2-CHR^vR^{vi}$ wherein $R^v$ and $R^{vi}$ are alkyl having from 1 to about 20 carbon atoms each; $m$ is 2, 1 or 0; and $n$ is 1 or 0, the sum of $m$ and $n$ being not more than 2, and a-2. subjecting at least a part of the $(R''')_3Al$ from step (a-1) to chain growth with ethylene or propylene to produce $R_3Al$.

7. The process of claim 6 wherein the isobutyl radical containing alkyl aluminum compound is triisobutyl aluminum.

8. The process of claim 6 wherein the isobutyl radical containing alkyl aluminum compound is diisobutyl aluminum hydride.

9. The process of claim 2 wherein $(R'')_3Al$ consists essentially of triethyl aluminum, the complex $2(R'')_3Al:MX$ of step (c) is $2(C_2H_5)_3Al$:sodium cyanide, the complex of the product mixture of step (d) is $R_3Al:(C_2b45)_3Al$:Sodium cyanide, ethylene is used in the displacement step ⅛e¼ and the complex formed in step ⅛e¼ is $2(C_2H_5)_3Al$:sodium cyanide.

* * * * *

UNITED STATES PATENT OFFICE
CERTIFICATE OF CORRECTION

Patent No. 3,696,161                             Dated October 3, 1972

Inventor(s)       Paul Kobetz and Kenneth L. Lindsay

It is certified that error appears in the above-identified patent and that said Letters Patent are hereby corrected as shown below:

Column 1, line 27, reads "$K[Al(C_2BR5)_3F]$", should read, -- $K[Al(C_2H_5)_3F]$ --; line 29, reads "$KF \cdot 2Al(C^2H^5)$", should read -- $KF \cdot 2Al(C_2H_5)$ --; line 32, reads "$KF \cdot Al(C^2H^5)_3$", should read -- $KF \cdot Al(C_2H_5)_3$ --. Column 6, line 3, reads "complex f 2", should read -- complex of 2 --; line 40, reads "$R_3Al:MX.$", should read -- $R_3Al:(R")_3Al:MX.$ --. Column 8, line 44, reads "such a", should read -- such as --. Column 9, line 6, reads "from", should read -- form -- ; line 17, reads "feed", should read -- fed to --; line 49, reads "form one", should read -- from 1 --. Column 10, Table, reads "Alpha Olefins, $C_2H_2n$", should read -- Alpha Olefins, $C_nH_{2n}$ --; line 51, reads "in reacted", should read -- is reacted --. Column 11, line 8, reads "AL", should read -- Al --. Column 12, line 48, reads "AL", should read -- Al --. Column 14, line 12, reads "$C_2b45$)", should read -- $(C_2H_5)$ --; line 13, reads "$1/8e_{1/4}$", should read -- (e) --; line 14, reads "$1/8e_{1/4}$", should read, -- (e) --.

Signed and sealed this 1st day of January 1974.

(SEAL)
Attest:

EDWARD M. FLETCHER, JR.            RENE D. TEGTMEYER
Attesting Officer                  Acting Commissioner of Patents